United States Patent
Weiss et al.

(10) Patent No.: US 12,502,090 B2
(45) Date of Patent: Dec. 23, 2025

(54) CAMERA-BASED VITAL SIGN DETECTION

(71) Applicant: KONINKLIJKE PHILIPS N.V., Eindhoven (NL)

(72) Inventors: Steffen Weiss, Hamburg (DE); Wenjin Wang, Shanghai (CN); Albert Garcia Tormo, Eindhoven (NL); Jan Hendrik Wuelbern, Hamburg (DE); Albertus Cornelis Den Brinker, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/291,344

(22) PCT Filed: Jul. 26, 2022

(86) PCT No.: PCT/EP2022/070913
§ 371 (c)(1),
(2) Date: Jan. 23, 2024

(87) PCT Pub. No.: WO2023/011981
PCT Pub. Date: Feb. 9, 2023

(65) Prior Publication Data
US 2024/0206754 A1    Jun. 27, 2024

(30) Foreign Application Priority Data

Aug. 2, 2021 (EP) .................................... 21189063

(51) Int. Cl.
A61B 5/026 (2006.01)
A61B 5/00 (2006.01)
A61B 5/024 (2006.01)

(52) U.S. Cl.
CPC ........ *A61B 5/0261* (2013.01); *A61B 5/02427* (2013.01); *A61B 5/7203* (2013.01); *A61B 5/7292* (2013.01)

(58) Field of Classification Search
CPC . A61B 5/0261; A61B 5/02427; A61B 5/7203; A61B 5/7292
See application file for complete search history.

(56) References Cited

U.S. PATENT DOCUMENTS

| | | | | |
|---|---|---|---|---|
| 5,747,789 A | * | 5/1998 | Godik | A61B 5/0059 |
| | | | | 250/341.8 |
| 2002/0117545 A1 | * | 8/2002 | Tsikos | G02B 27/48 |
| | | | | 235/454 |

(Continued)

OTHER PUBLICATIONS

International Search Report and Written Opinion from PCT/EP2022/070913 mailed Nov. 3, 2022.

(Continued)

*Primary Examiner* — Dixomara Vargas

(57) ABSTRACT

A vital sign detection system comprises a camera (10) configured to acquire image frames from an examination zone (42). A signal processor (11) derives vital sign information from the acquired image frames. An illumination controller (12) controls illumination of the examination zone, generates temporal modulations of the illumination and synchronise the camera frame rate with the modulated illumination. The vital sign detection system of the invention achieves to increase the dynamic range and hence also the signal-to-noise ratio of the vital sign signal.

13 Claims, 4 Drawing Sheets

(56) References Cited

U.S. PATENT DOCUMENTS

| | | | | |
|---|---|---|---|---|
| 2005/0023353 A1* | 2/2005 | Tsikos | .................... | G02B 26/10 |
| | | | | 235/454 |
| 2017/0354334 A1 | 12/2017 | Tarassenko et al. | | |
| 2020/0099839 A1* | 3/2020 | Zalevsky | ............ | G01B 9/02011 |
| 2020/0234495 A1* | 7/2020 | Nakao | ................. | A63F 13/5258 |
| 2020/0294228 A1* | 9/2020 | Hu | ..................... | A61B 5/7257 |
| 2020/0404198 A1* | 12/2020 | Kobayashi | ............. | H04N 25/76 |
| 2024/0065616 A1* | 2/2024 | Palero | ................ | A61B 5/14551 |

OTHER PUBLICATIONS

Verkruysse, W.; Svaas, ; L.O.; Nelson, J.S. "Remote plethysmographic imaging using ambient light" Opt. Exp. 2008, 16, 21434-21445.

De Haan, G. & Jeanne, V. "Robust pulse-rate from chrominance-based rPPG" IEEE Transactions on Biomedical Engineering 60, 2878-2886 (2014).

W. Wang, L. Vosters, and A. C. den Brinker, "Continuous-spectral infrared illuminator for camera-PPG in darkness," Sensors 20 (11) (2020).

* cited by examiner

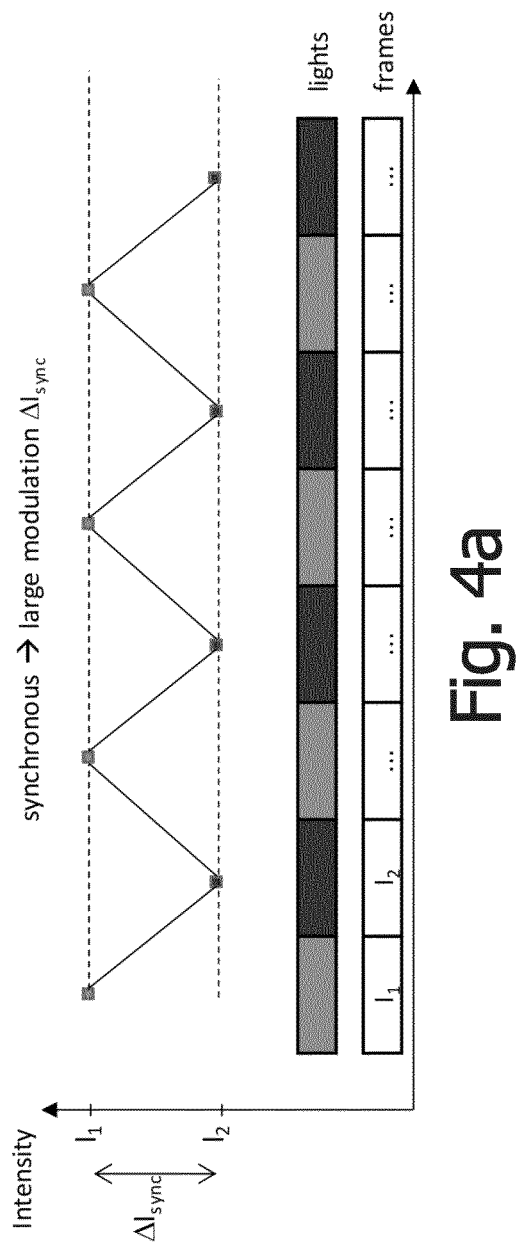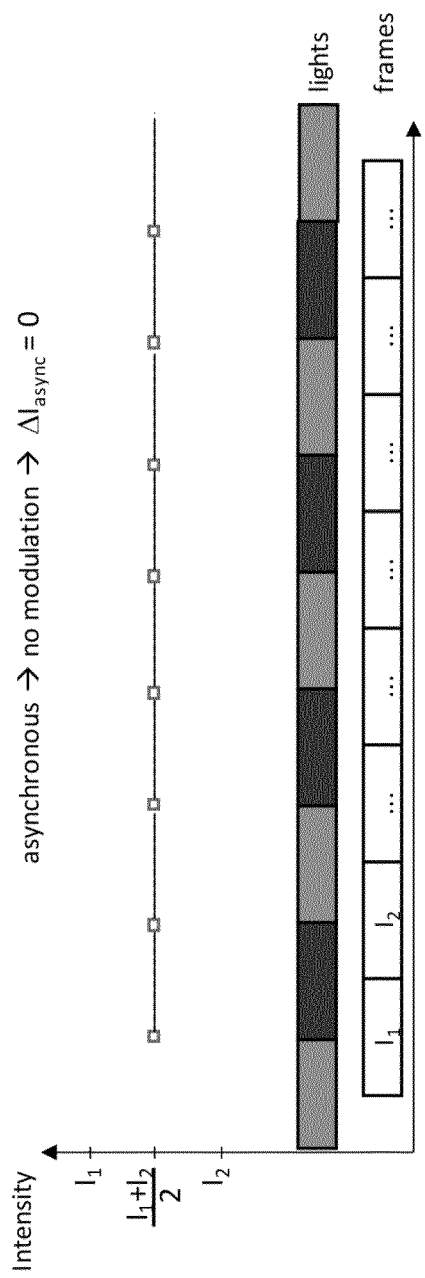

CAMERA-BASED VITAL SIGN DETECTION

CROSS REFERENCE TO RELATED APPLICATIONS

This application is a U.S. national phase application of International Application No. PCT/EP2022/070913 filed on Jul. 26, 2022, which claims the benefit of EP Application Serial No. 21189063.7 filed on Aug. 2, 2021 and is incorporated herein by reference.

FIELD OF THE INVENTION

The invention pertains to a vital sign detection system comprising a camera configured to acquire image frames from an examination zone and a signal processor to derive vital sign information from the acquired images.

BACKGROUND OF THE INVENTION

The multi-wavelength variant of remote PPG (MV-rPPG) is desired for camera-based pulse measurement as it improves robustness and enables Sp02 measurements. Time-multiplexing is attractive for turning monochrome camera-rPPG solutions as in Philips MR VitalEye into MV without any change of camera hardware. However, time-multiplexing requires accurate synchronization between light switching and camera frame acquisition. It is typically achieved by triggering cables but may not available or easy to install in existing set-ups as MR VitalEye.

Remote photoplethysmography (rPPG) can be used to measure the cardiac pulse rate and even the current cardiac phase in real-time based on a video stream of the face of a human subject. Multi-wavelength rPPG using several different wavelengths simultaneously for rPPG signal generation has been proposed to improve the SNR of the rPPG signal, automatic skin selection and the robustness of this signal with respect to changes in ambient lighting and motion of the subject. The straight-forward way to realize multi-wavelength rPPG is to use a color camera. However, color cameras come with fixed RGB colors. If other combinations of wavelength bands than these RGB colors, e.g. including infrared (IR) light should be used, if a set-up already consists of only a monochrome camera, or if a monochrome camera should be used to save cost or reduce the form factor (compact design), then it is possible to implement the multi-wavelength feature by using a single monochrome camera and several light sources, one for each wavelength band. This approach requires the exact synchronization of the frame acquisition of the camera and the switching of the light sources. Typically, this is realized by triggering the camera and the controller of the light sources with the same trigger signal. However, this requires fast signal links to light controller and camera.

Such a vital sign detection system is known from the US-patent application US2017/0354334.

The known vital sign detection system makes use of camera-based measurements of the vital signs of a subject. Notably, video images are acquired and are processed to obtain a remote reflectance photoplethysmogram (rPPG) for the region-of-interest. Signal averaging is employed to improve the signal-to-noise ratio of the rPPG-signal.

SUMMARY OF THE INVENTION

An object of the invention is to provide a vital sign detection system that is more robust in the generation of the vital sign signal. This object is achieved by the vital sign detection system as defined in claim 1. On of the technical advantages (non-limiting example) is to have camera and light sources as having fast syncrhonization for more efficient vital detections systems.

The vital sign detection system's camera acquires image frames from the examination zone, notably of a subject to be monitored that is placed in the examination zone. The examination zone with the subject are illuminated by an illumination arrangement that is configured to illuminate predominantly a region-of-interest of the subject, in particular an area of the subject's bare skin, so that the camera may acquire the image frames from the illuminated subject in (non-specular) reflection. The illumination arrangement may be configured as an in-bore illumination system. From the acquired image frames the signal processor derives one or more vital sign signals. In particular, temporal variations in blood volume in the subject's tissue lead to variations in absorption and reflection of the illumination's light. Hence, from the image frames a temporal rPPG-signal may be derived. The illumination contains a temporal modulation and the camera frame rate is synchronised with the temporal modulation. This enables that the signal processor to eliminate baseline illumination from the image frames, and isolate the contribution of the vital sign (e.g. blood flow) from the image frames. Accordingly, the dynamic range and hence also the signal-to-noise ratio of the vital sign signal is increased. Further, the illumination may be generated by an illumination arrangement that illuminates the examination room in which the vital sign detection system is located.

These and other aspects of the invention will be further elaborated with reference to the embodiments defined in the dependent Claims.

In a preferred embodiment of the vital sign detection system, the signal processor may compute differences between successive image frames. These successive image frames are selected with respect to the temporal modulation of the illumination such that the modulation phases of the illumination are different in the respective image frames. This allows to eliminate the baseline contribution of the illumination from the image frames and retain the vital sign signal at higher signal-to-noise ratio.

In a further preferred embodiment of the vital sign detection system, the illumination system is considered part of the vital sign detection system and is configured to emit illumination having a spectral component in the haemoglobin spectral absorption band. This renders the image frames particularly sensitive to absorption by blood in the subject's tissue in especially the wavelength range of 550-600 nm. Consequently, the rPPG-signal is vastly enhanced because the illumination contains a very strong spectral components around the absorption maximum of haemoglobin. This embodiment may be incorporated in a magnetic resonance examination system of which the examination zone is illuminated by white light which includes such a very strong spectral component around the absorption maximum of haemoglobin.

In a practical example, the temporal modulation frequency in in the range 20-60 Hz. In this range the modulation frequency is sufficiently high to cover time variations in the vital sign signal, while variations of the illumination by macroscopic external causes are often at a much slower time scale than tens of milliseconds.

In a further practical example, the image frame rate of the camera is twice the temporal modulation of the illumination. Preferably, the camera operation is phase-locked with the modulated illumination. In this example, any pair of image frames adjacent in time are acquired at opposite modulation phases of the modulated illumination: e.g. one image frame at illumination on, and one at illumination off. As a result successive images are acquired by the camera with and without the illumination contributing. The difference image between the image of the successive pair predominantly contains the vital sign contribution as the ambient background is cancelled out. This allows to eliminate the baseline illumination and retain the vital sign information by subtraction of the image frames of each pair.

In another example the vital sign detection system may be arranged in a room with external ambient light. The external ambient light may have an inherent temporal modulating frequency that is linked to the mains frequency at which the ambient light is powered. Choosing the temporal modulation frequency of the illumination of the examination zone equal to the inherent temporal modulation frequency avoids beats between the external ambient light and the (additional) illumination of the examination zone. For example, the vital sign detection system may be combined or incorporated with an magnetic resonance examination system of which the examination zone within the magnet bore is illuminated by a bore light incorporated in the magnetic resonance examination system and also by the ambient light from the room in which the magnetic resonance examination system is placed reaches the examination zone. This example of the invention avoids disturbing beats in the vital sign signal between the bore light and the ambient light from the room.

In a practical implementing the synchronisation of the camera frame rate and the illumination modulation is adjusted so that the modulation depth of image brightness is (close to) maximum. Then the camera frame rate and the illumination modulation are in-phase.

The camera may be a monochrome camera as there is only need for brightness differences due to different wavelength bands of the illumination. Notably, the synchronisation does not need the formation of colour images.

In another embodiment the vital sign detection system, comprises a signal analyser to detect the modulation depth of image frames' detected brightness between successive image frames. The illumination controller is configured to generate wavelength band modulations of the illumination of the examination zone and synchronise the camera frame rate in dependence the modulation depth. The image brightness is different for the respective wavelength bands. This is for example owing to wavelength dependence of absorption and reflection from subject (e.g. patient to be examined) in the examination zone. Further, wavelength dependence of the detection sensitivity of the camera for the respective wavelength bands may add to different image brightness of the acquired image frames. This embodiment is based on an insight that the modulation depth is dependent of the synchronisation of the wavelength modulation and the camera frame rate. The differences between image brightness of successive image frames is largest when the wavelength modulation and the camera frame rate are in-phase. Then each individual image frame is associated with an image from illumination from one wavelength band. When the wavelength modulation and the camera frame rate are out-of-phase (or in anti-phase) then each individual image frame's image brightness is effectively an average over different wavelength bands and the difference between image brightness of successive image frames is minimal, or even zero. Accordingly, this embodiment based on wavelength modulation achieves synchronisation of the camera frame rate and the illumination modulation based on the acquired stream of the acquired image frames. In this way, synchronisation is accurate and implemented in a simple manner. In particular, there is no need to accurately adjust signal transmit times due to different lengths of signal leads to the camera and the illumination controller. A simple implementation the illumination controller is configured to compute the average brightness values (over the pixels of each of the image frames) of the image frames. The Fourier transform of this time series of average brightness is computed, e.g. by way of a sliding window of a predetermined number of image frames. The average brightness values may be derived from a selected region-of-interest in the image frames in which differences between illumination with different wavelength is relatively high. Further, the modulation depth of the wavelength band modulation may be measured while the rate of the wavelength band modulation is much slower than the image frame rate. Then the temporal illumination pattern approaches a rectangular waveform. This may be implemented in practice in an easy way be generating the wavelength band modulation by switching on/off different sets of colour LEDs and using an image frame rate in the range of 10-100 Hz, so that the modulation depth can be measured within a second. Alternatively, an additional object having marked colour differences may be arranged in the camera's range. For example a hardware test-image on a sticker may be used. The accurate synchronisation of the wavelength band of the illumination with the camera frame rate then corresponds with the dominant frequency component (i.e. having the largest amplitude) in the series of average brightness values. In the simple implementation in which only two different illumination wavelengths are employed, a sliding window average of the modulus of the difference of the brightness of subsequent image frames represents the modulation depth.

Control of the camera frame rate relative to the rate of the wavelength band modulation of the illumination may be achieved by way of a feedback loop in which the modulation depth of the modulation depth of the image frames is maximum. Positive and negative phases delays in the time course of the illumination modulation may be introduced by this feedback loop and the maximum modulation depth is then obtained at the camera frame rate being accurately in-phase in a stable manner with illumination wavelength band modulation.

In a practical embodiment the illumination wavelength band modulation and the camera frame rate are controlled by a common processor of the vital sign detection system. Upon arrival of the current image frame at the processor, the wavelength band of the illumination is switched. This may be implemented by LED-based illumination and switch on/off of different (sets) of LEDs operating at the respective wavelength bands. In this way the frequencies of the camera frame rate (i.e. the image frame rate) and of the illumination wavelength band modulation are at equal frequencies. Any phase delays that may be introduced by different transit times between control signals for the camera and the illumination may be corrected for by maximising the modulation depth of the illumination. This correction may be derived from the image frames without specific determination of the individual signal delays.

In another implementation an interleaved re-synchronisation measurement in which a $\pi/2$-phase angle is introduced in the wavelength band modulation and the image frame rate. Then the modulation depth has a high sensitivity for small phase variations in the synchronisation of the image frame rate and the illumination wavelength band modulation. The sign of the variation of the modulation depth variation with a small additional phase determines whether to (in)(de)crease the phase between the image frame rate and the illumination wavelength band modulation in order to resynchronise into the in-phase synchronisation.

The vital sign signal from the vital sign detection system may be employed as a trigger signal for another imaging system, such as a magnetic resonance examination system, or a computed-tomography. Then the vital sign detection system of the invention functions as a synchronisation system for the imaging system to acquired image data, such as k-space profiles, x-ray absorption profiles or sinograms, synchronised the detected vital sign. For example, the vital sign may be a patient's heart rate, so that the vital sign signal represents an R-peak in the patient's electrocardiogram and the image data are acquired synchronised with the patient's heart rate. This enables to avoid cardiac motion artefacts in the images reconstructed form the acquired image data.

The camera-based implementation of the vital sign detection system of the invention in clinical practice achieves inter alia (i) better region-of-interest detection (or skin detection) in the multi-dimensional color space. i.e. the DC color of objects/skin can be used for better skin and non-skin segmentation: (ii) better vital sign signal (e.g. PPG-signal) signal quality, i.e. pulsatile component has characteristic features in multi-dimensional colour space, which can be used to differentiate from the distortions (e.g. body motion).

The invention also relates to a vital sign detection method as defined in claim 11. This vital sign detection method of the invention achieves to increase the dynamic range and hence also the signal-to-noise ratio of the vital sign signal. The invention further relates to a computer programme as defined in claim 13. The computer program of the invention can be provided on a data carrier such as a CD-rom disk or a USB memory stick, or the computer programme of the invention can be downloaded from a data network such as the world-wide web. When installed in the computer included in a vital sign detection system the vital sign detection system is enabled to operate according to the invention and achieves to increase the dynamic range and hence also the signal-to-noise ratio of the vital sign signal.

These and other aspects of the invention will be elucidated with reference to the embodiments described hereinafter and with reference to the accompanying drawing wherein

DETAILED DESCRIPTION OF THE EMBODIMENTS

In some embodiments, a trigger-less synchronization based on video analysis is being disclosed. It is based on the insight that for perfect synchronization the modulation of the spatial average of frame intensity over time is maximal. We continuously adapt light switching by small delays that maximize this modulation. Further embodiments for region of interest-based analysis and for two light sources only are given to increase robustness of this method.

Figure 1:
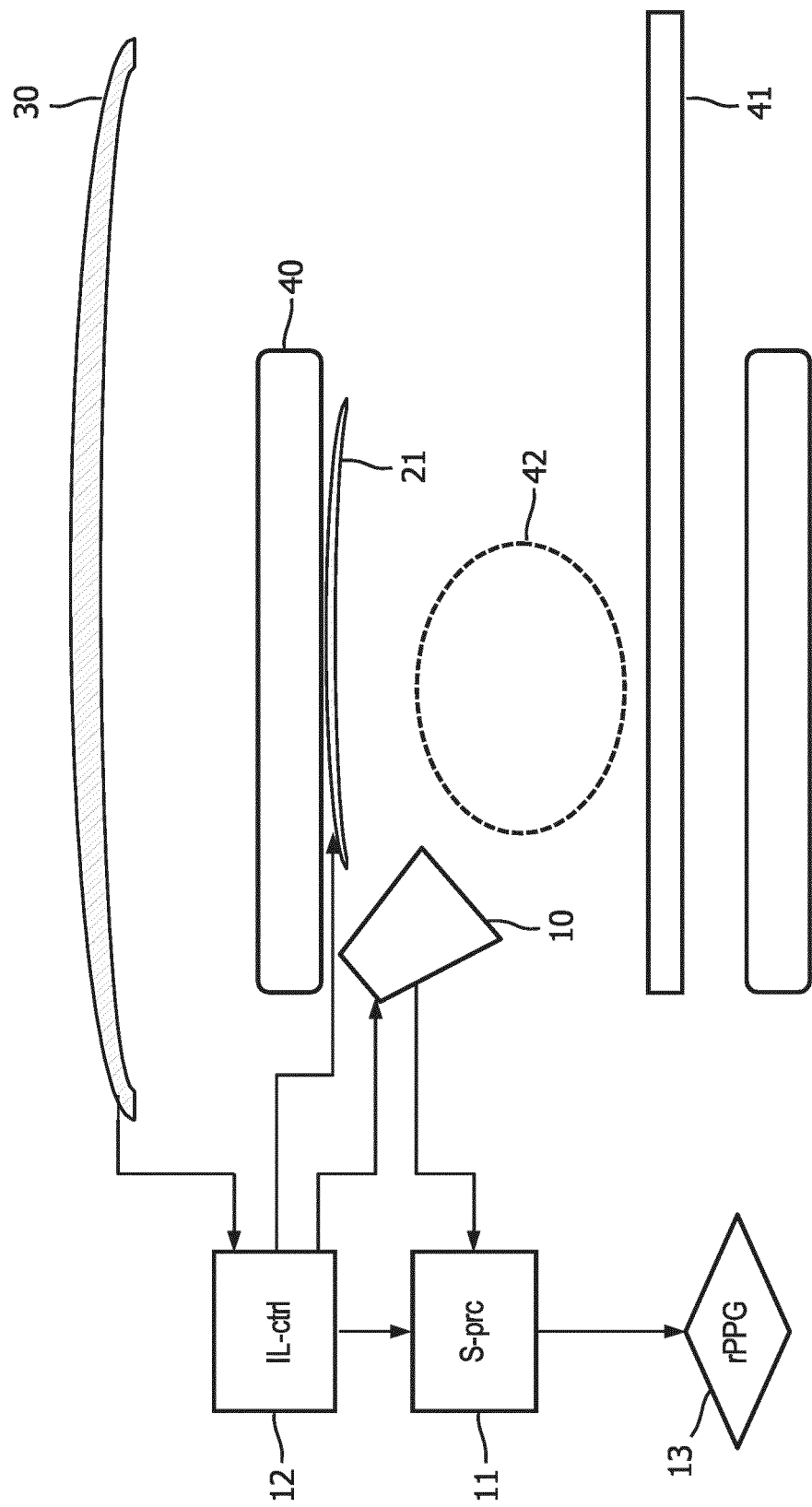
FIG. 1 shows a schematic side elevation of a tomographic imaging system in which an embodiment of a vital sign detection system of the invention is incorporated.

FIG. 1 shows a schematic side elevation of a tomographic imaging system in which a an embodiment of a vital sign detection system of the invention is incorporated. A tomographic imaging system 40 is schematically represented by its frame 41, patient carrier 42 and the examination zone 43 defined by the gantry. For example, for a computed-tomography system the frame is formed by the gantry in which an x-ray source and x-ray detector are rotatably mounted to rotated around the examination zone. In another example for a magnetic resonance examination system the frame constitutes the structure that carries the magnet assembly and the examination zone is defined by the volume in which the magnet assembly applies a uniform magnetic field and accurately linear gradient magnetic fields. For example the examination zone is formed by (part of) the magnet bore of a cylindrical configuration of the magnet assembly or formed by the space between opposite magnet pole shoes of a an open type magnet assembly. An illumination system 20 is provided to illuminate the examination zone 43 and includes the illumination arrangement 21 and the illumination controller 12. The illumination controller 12 drives the illumination arrangement 21 so as to generate an amplitude modulated illumination of the examination zone. The illumination arrangement may include an array of LED white light sources that have a significant spectral component in the green wavelength range of 550-600 nm. In this wavelength range, the brightness level of the LED white light sources may be higher than that of infrared illumination without running into safety issues. The illumination controller 12 is typically configured to drive the illumination arrangement 21 in the amplitude modulated mode at a modulation frequency in the range of 35-45 Hz, for example at 40 Hz. This modulation frequency range is beyond the temporal resolution of the human visual system, so that the patient to be examined and the operator or support staff are not disturbed by flickering of the illumination system. The illumination control also communicates to the camera 10 to synchronise the camera's frame rate at which image frames from the examination zone (and the patient to be examined) are acquired with the amplitude modulation of the illumination system. In this way is it achieved that the camera acquis images at the respective modulation phases of the illumination. The image frames form the camera are applied to the signal processor 11 which drives the vital sign information 13, i.e. the rPPG-signal, from the image frames. In particular the signal processor may subtract image frames for the respective modulation phases the isolate the vital signal information. Good results are achieved by subtraction of successive image frames from the different modulation phases. This may be successive images from the examination zone for illumination on and off. Background signal is then removed in the subtraction that predominantly pertains to vital sign information of the patient to be examined. Because the modulation frequency is much higher than temporal variations of ambient light e.g. from ambient illumination 30 of the room, or other external causes, residual signal in the subtraction images is small, notably inversely proportional to the modulation frequency. The illumination controller may further comprise phase-locking circuitry to phase-lock the illumination system with ambient illumination to avoid beats between the illumination of the examination zone with periodicity in the light output of the ambient illumination. This is beneficial in the event the ambient illumination is directly driven at mains frequency (50-60 Hz). This enables the vital sign detection system of the invention to be installed in an environment where there is ambient illumination directly driven at mains frequency. This facilitates easy siting of a tomographic imaging system with the vital sing detection system of the invention.

Figure 2:
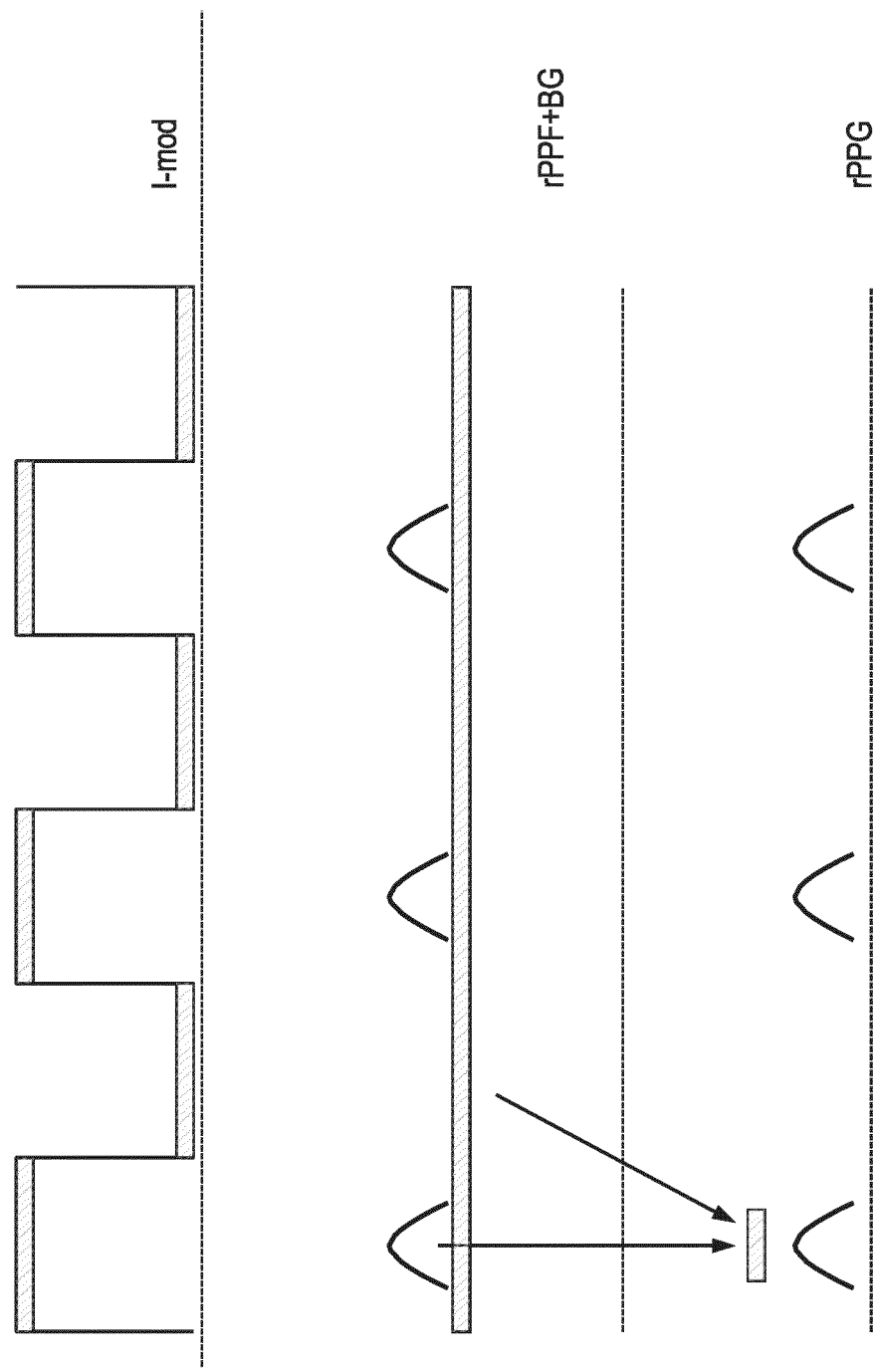
FIG. 2 shows a diagrammatic representation of the time evolution of the modulated illumination, the signal acquired by the camera and the signal presented vital sign information

FIG. 2 shows a diagrammatic representation of the time evolution of the modulated illumination, the signal acquired by the camera and the signal representing vital sign information. The trace I-mode represents the amplitude modulation of the illumination with time. The trace has alternating modulation phases 61,62 of high and low brightness. The race rPPG-BG represents a remote PPG signal added to a background signal level. The rPPG signal is high in the high illumination phases and in the low (dark) illumination phases on a background signal is detected by the camera. The signal trace rPPG is formed from subtraction of successive image frames at the alternate modulation phases of the illumination modulations.

Figure 3:
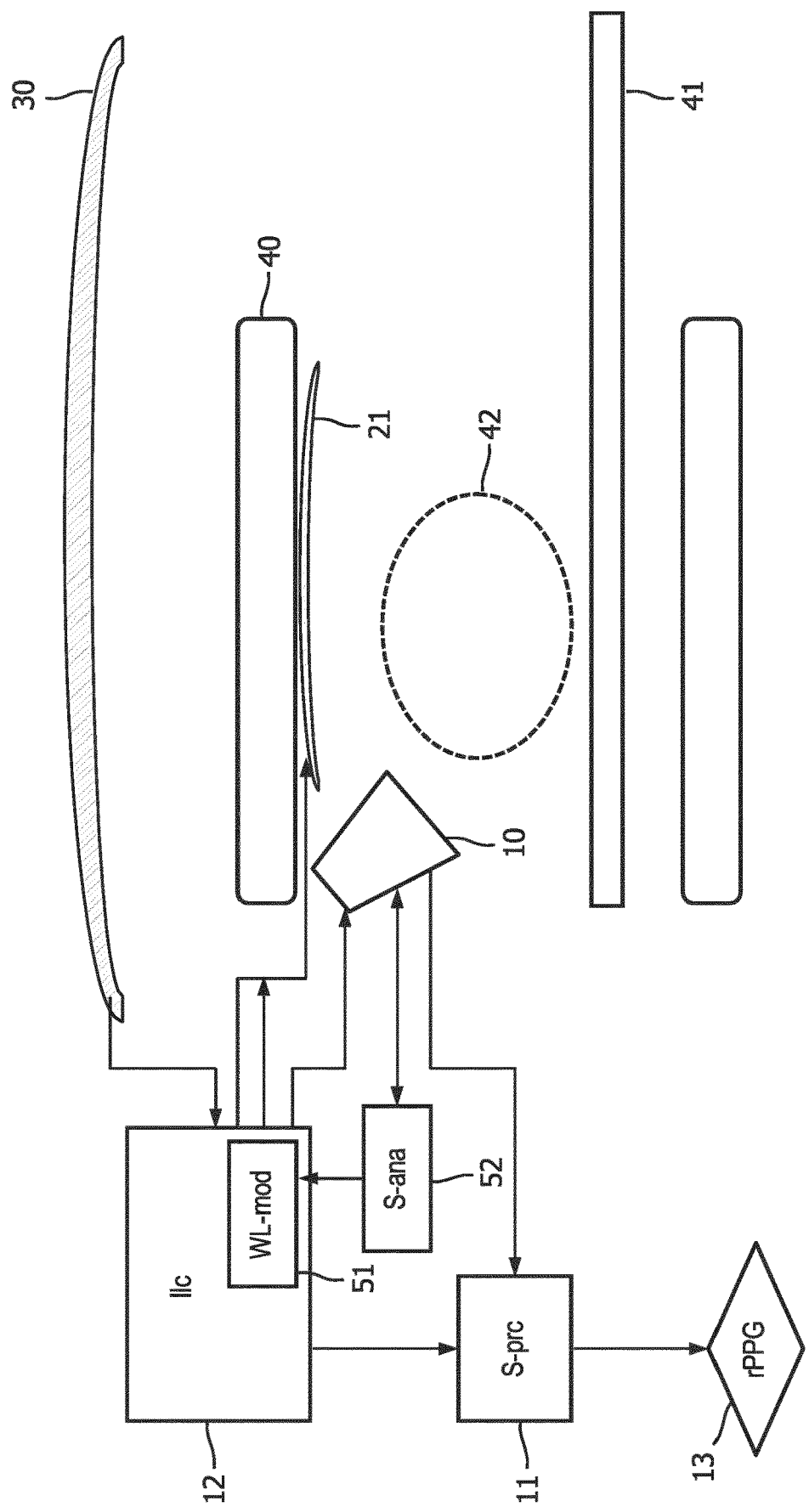
FIG. 3 shows a schematic side elevation of a tomographic imaging system in which another embodiment of a vital sign detection system of the invention is incorporated.

FIG. 3 shows a schematic side elevation of a tomographic imaging system in which another embodiment of a vital sign detection system of the invention is incorporated. In the implementation of FIG. 3, the illumination controller is provided with a wavelength modulator 51 that controls the illumination arrangement 21 to operate at temporal wavelengths. For example the illumination arrangement 21 may be fitted with different colour LEDs that are alternatingly switched by the wavelength modulator 51. The vital sign detection system in this implementation is provided with a signal analyser that is circuited to receive the image frames from the camera 10. The signal analyser 52 is configured, i.e. software functionality to determine the modulation depth of the image frames' brightness values between image frames dependent on the relative phase between the camera frame rate and the wavelength modulation of the illumination. On the basis of the detected modulation depth of the image frames, the illumination controller 12 generates wavelength band modulations of the illuminations emitted by the illumination arrangement. And on the basis of the detected modulation depth as a function of the relative phase, the camera frame rate is synchronised with the modulated illumination in that the relative in-phase of the illumination wavelength modulation and the camara frame rate is found at maximum wavelength modulation depth. In particular the signal analyser determines maximum modulation depth dependent on the temporal modulation rate of the illumination. Then the camera frame rate is set and synchronised with the frame rate illumination modulation being maximum. That is the camera frame rate in synchronised with the illumination modulation on the basis of information of the camera frame rate. This may be implemented in that the wavelength modulation depth between successive image frames is measured continuously by the signal analyser 52 that adjusts the camara frame rate and the illumination modulation and their relative phase kept in-phase by maintaining maximum wavelength modulation dept, or by maintaining a wavelength modulation depth above a pre-set threshold value.

A further detail of the implementation of the invention concerns a metric to measure the quality of synchronization between the light source (switching phase) and camera (sampling phase). The quality metric is performed online (in a real time fashion) to assess the quality of each newly arriving frame. If the synchronization is perfectly in-phase, the contrast between the multi-wavelength DC values will be the maximum (e.g. steep/large contrast between the values in the DC vector): if the synchronization is poor (out-of-phase), the contrast will be reduced as the frame is taken from a joint portion of two wavelengths (e.g. different wavelengths have contributions in a single frame). Hence, the DC vector will be flatter. In the worst case that the synchronization is completely anti-phase, the vector will be flat. Therefore, we define a DC vector that measures the DC values of the region-of-interest pixels at different wavelengths (e.g. use 3-wavelength as the showcase here) as:

$$DC = [\text{mean}(ROI_{wavelength1}), \text{mean}(ROI_{wavelength2}), \text{mean}(ROI_{wavelength3})]$$

To ease the interpretation and optimization, we normalize the DC vector by its total energy (e.g. $L_1$-norm or $L_2$-norm) as the total strength does not matter here, only the contrast matters:

$$\overline{DC} = \frac{DC}{\text{sum}(DC)}$$

Which is the normalized DC vector of multi-wavelength values. This vector is measured for each new frame in real time.

In case of poor synchronization, a time delay (for camera) is determined such that the $\overline{DC}$ vector has the largest contrast, which means that it needs to deviate from the [1,1,1] direction (e.g. flat) as much as possible. Thus, the below optimization function may be employed:

$$\max_{delay}(\left\|\overline{DC}_{delay} - \frac{[1,1,1]}{3}\right\|_2)$$

This maximises the L2-distance between the normalized DC vector and the undesired [1,1,1] direction. Note other distances can be used as well, such as maximizing the (cosine) angle between the two vectors. The output of this optimization function is a time delay that the camera needs compensate its unsynchronized phase and to be synchronized with the light source again.

In some embodiments, the average intensity $I_i$ of each frame i is calculated. If the synchronization is perfect, then the modulation amplitude $I_i$ is maximal as sketched in FIG. 4a. If light switching and image acquisition are becoming out of sync, the modulation amplitude decreases as in FIG. 4b. In some embodiments, it is proposed to evaluate this modulation amplitude continuously and to adapt preferentially the phase of the light switching frequency if a decrease is detected. Alternatively, small positive or negative delays are repeatedly introduced in the time course of the light switching. One of the effects of this is that the light switching and frame acquisition is kept synchronous. In some embodiments, the algorithm can be adapted in the temporal domain, in other embodiments, the algorithm is adapted in the spatial domain. In the temporal domain, it is known that the modulation frequency of light source (n times the camera sampling rate), will lead to a delay that can make the spectrum peak of the video signal at the modulation frequency as high as possible. To optimize in the spatial domain, an optimized subset of pixels to increase the DC contrast between the wavelength bands in this subset is being used. This allows to decrease the lag between the acquisitions.

In some embodiments, the rPPG data acquisition may be altered, for instance stopped for a few frames in order to interleave a synchronization measurement. For the synchronization measurement in this embodiment, the phase of the light switching may be deliberately offset by quarter of a cycle to introduce a 90° phase angle between light switching and frame acquisition, effectively realizing a situation in between FIGS. 4a and 4b. This sets the system to the operating point with maximal derivative of modulation amplitude with respect to the phase. This may lead to the following technical effects: a) small deviations in phase result in a maximal change of modulation amplitude, and b) the sign of this amplitude change carries information of whether to increase or decrease the phase. After this synchronization measurement which may last only a few cycles, the system may be switched back to in-phase to continue with rPPG data acquisition.

One of the challenges overcome by the invention is that the light produced by the modulation arrangement 21 is not optimal and syncrhonous. In this embodiments, the light sources from the modulation arrangement 21 are controlled from the same computer that ultimately receives the frames, the time point of frame arrival can be used for frequency synchronization. Therefore, whenever a frame arrives at the signal processor 11, the light sources of the modulation arrangement 21 are switched. One of the technical advantages of this approach is that both the camera 10 and the light sources are operated at exactly the same frequency (and without any cumulative error). However, the phase (delay) between both signals is still unknown and the method described in the present invention can be used to determine it and fully synchronize light switching and frame acquisition.

The invention claimed is:

1. A vital sign detection system comprising:
a camera configured to acquire image frames from an examination zone;
a signal processor configured to derive vital sign information from the acquired image frames;
an illumination controller configured to control illumination of the examination zone; and
generate temporal modulations of the illumination; and synchronize camera frame rate with the modulated illumination, wherein a signal analyzer is configured to detect modulation depth of image frames' detected between successive image frames is used; and
the illumination controller is configured to generate wavelength band modulations of the illumination of the examination zone and synchronize the camera frame rate in dependence of the modulation depth.

2. The vital sign detection system of claim 1, wherein the signal processor is configured to form difference images from successively acquired image frames at different modulation phases.

3. The vital sign detection system of claim 1, comprising an illumination arrangement for illuminating the examination zone, and configured to emit illumination including a spectral component within haemoglobin's spectral absorption band.

4. The vital sign detection system of claim 1, wherein the temporal modulation is an amplitude modulation with a modulation frequency in the range of 20-60 Hz.

5. The vital sign detection system of claim 2, wherein the frame rate is twice the temporal modulation frequency of the illumination.

6. The vital sign detection system of claim 2, wherein the camera is configured to operate in a phase-locked mode.

7. The vital sign detection system of claim 5, wherein the temporal modulation frequency of the illumination equals the modulation frequency of ambient light.

8. The vital sign detection system of claim 1, wherein the illumination controller is configured to synchronize the camera frame rate by adjusting the camera frame rate to a maximum of the modulation depth between successive image frames.

9. The vital sign detection of claim 1, wherein the illumination controlled is configured to perform an interleaved re-synchronization measurement in which a $\pi/2$-phase angle is introduced in the wavelength band modulation and the image frame rate.

10. The vital sign detection system of claim 1, wherein the camera is a monochrome camera.

11. A method comprising:
applying a temporal modulation of illumination of an examination zone;
synchronizing acquisition of image frames from an examination zone with the modulated illumination; and
deriving vital sign information from the acquired image frames;
detecting modulation depth of image frames' detected between successive image frames is used; and
generating wavelength band modulations of the illumination of the examination zone and synchronizing camera frame rate in dependence of the modulation depth.

12. The method of claim 11, wherein
the temporal illumination is implemented as a temporal wavelength band modulation;
successive image frames' brightness modulation depth between image frames is detected; and
the acquisition of image frames is synchronised in dependence of the modulation depth.

13. A computer program including instructions stored on a non-transitory computer readable medium, which when executed by a processor implements a method comprising:
applying a temporal modulation of illumination of an examination zone;
synchronizing acquisition of image frames from an examination zone with modulated illumination; and
deriving vital sign information from the acquired image frames,
detecting modulation depth of image frames' detected between successive image frames is used; and
generating wavelength band modulations of the illumination of the examination zone and synchronize camera frame rate in dependence of the modulation depth.

* * * * *